US009715095B2

(12) United States Patent
Ritter et al.

(10) Patent No.: US 9,715,095 B2
(45) Date of Patent: Jul. 25, 2017

(54) MICROSCOPE AND METHOD FOR SPIM MICROSCOPY

(71) Applicant: Carl Zeiss Microscopy GmbH, Jena (DE)

(72) Inventors: Jörg Ritter, Jena (DE); Helmut Lippert, Jena (DE); Tobias Kaufhold, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 114 days.

(21) Appl. No.: 14/350,884

(22) PCT Filed: Oct. 6, 2012

(86) PCT No.: PCT/EP2012/004194
§ 371 (c)(1),
(2) Date: Apr. 10, 2014

(87) PCT Pub. No.: WO2013/053454
PCT Pub. Date: Apr. 18, 2013

(65) Prior Publication Data
US 2014/0254005 A1     Sep. 11, 2014

(30) Foreign Application Priority Data

Oct. 11, 2011   (DE) .................. 10 2011 115 946
Aug. 7, 2012    (DE) .................. 10 2012 015 861
Sep. 28, 2012   (DE) .................. 10 2012 019 466

(51) Int. Cl.
G02B 21/06    (2006.01)
G02B 21/16    (2006.01)
G02B 21/36    (2006.01)

(52) U.S. Cl.
CPC ............ *G02B 21/06* (2013.01); *G02B 21/16* (2013.01); *G02B 21/367* (2013.01)

(58) Field of Classification Search
CPC ...... G02B 21/16; G02B 21/367; G02B 21/06; G02B 21/002; G02B 21/008; G02B 21/0084; G02B 21/365; G02B 21/244
See application file for complete search history.

(56) References Cited

U.S. PATENT DOCUMENTS 6,724,419 B1    4/2004  Green et al.
2006/0018013 A1* 1/2006  Suzuki ............... G01N 21/6452
                                                359/368

(Continued)

FOREIGN PATENT DOCUMENTS

DE    10 2007 045897    4/2009
DE    10 2008 038359    2/2010

(Continued)

OTHER PUBLICATIONS

Notification of Transmittal of the Translation of International Preliminary Report on Patentability dated Apr. 24, 2014.

(Continued)

*Primary Examiner* — Thomas K Pham
*Assistant Examiner* — Cara Rakowski
(74) *Attorney, Agent, or Firm* — Haug Partners LLP

(57) ABSTRACT

A method for SPIM microscopy, wherein the sample is moved continuously, and a plurality of images are taken at time intervals by means of a detection arrangement during the movement. The image capture duration or exposure time is dimensioned such that the movement path of the sample lies within a predetermined resolution range of the detection objective. The speed of the sample movement is determined and set by the image capture duration or exposure time and/or the distortion of the point spread function generated by the sample movement of the sample. The image blur is corrected computationally by the respective image capture duration and the movement speed. A sharp image is generated in this way. The actual optical section thickness of the (Continued)

light sheet is determined from the light sheet thickness, and the movement speed is determined therefrom and from user settings.

12 Claims, 6 Drawing Sheets

(56) References Cited

U.S. PATENT DOCUMENTS

| | | |
|---|---|---|
| 2006/0033987 A1 | 2/2006 | Stelzer et al. |
| 2007/0109633 A1 | 5/2007 | Stelzer et al. |
| 2008/0137978 A1* | 6/2008 | Fu .................. H04N 5/23254 382/255 |
| 2009/0174937 A1 | 7/2009 | Holy et al. |
| 2009/0225413 A1 | 9/2009 | Stelzer et al. |
| 2009/0244698 A1 | 10/2009 | Zust |
| 2010/0201784 A1 | 8/2010 | Lippert et al. |
| 2013/0094755 A1 | 4/2013 | Lippert et al. |

FOREIGN PATENT DOCUMENTS

| | | |
|---|---|---|
| JP | 2006-518050 | 8/2006 |
| JP | 2008-146643 | 6/2008 |
| JP | 2010-540994 | 12/2010 |
| WO | WO 2004/053558 | 6/2004 |
| WO | WO 2004/075107 | 9/2004 |
| WO | WO 2010/020371 | 2/2010 |

OTHER PUBLICATIONS

International Search Report for Application No. PCT/EP2012/004194 dated Jan. 2, 2013.

Holekamp et al., *"Fast Three-Dimensional Fluorescence Imaging of Activity in Neural Populations by objective-Coupled Planar Illumination Microscopy"*, Neuron 57, 661-672, Mar. 13, 2008.

Huisken et al *"Optical Sectioning Deep Inside Live Embryos by Selective Plane Illumination Microscopy"*, Science vol. 305, Aug. 13, 2004.

Keller et al. "Reconstruction of Zebrafish Early Embryonic Development by Scanned Light Sheet Microscopy", Sciencexpress, Oct. 9, 2008.

Huisken et al., *"Selective Plane Illumination Microscopy Techniques in Developmental Biology"*, Development 136, 1963-1975, 2009.

Japanese Office Action for application No. 2014-534964 dated Sep. 27, 2016.

* cited by examiner

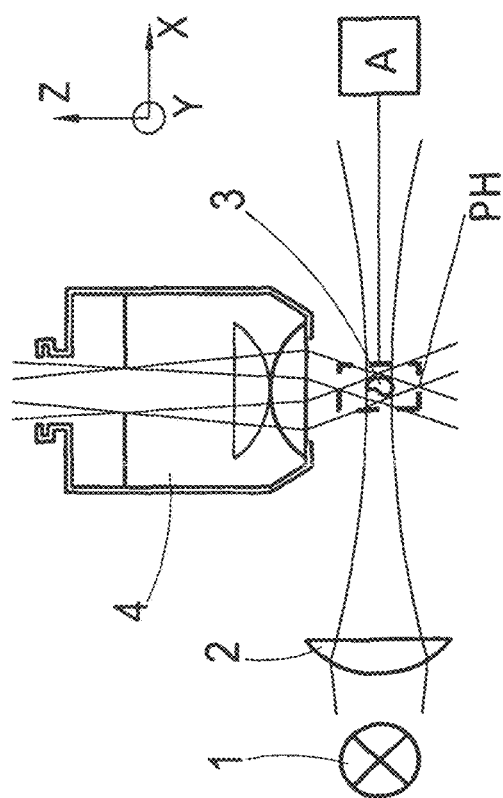

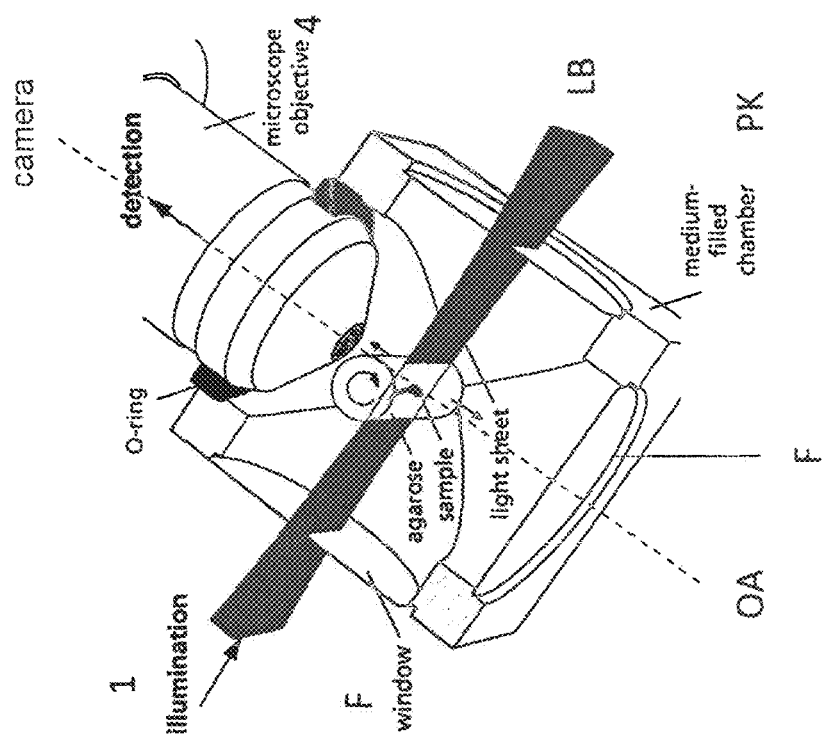

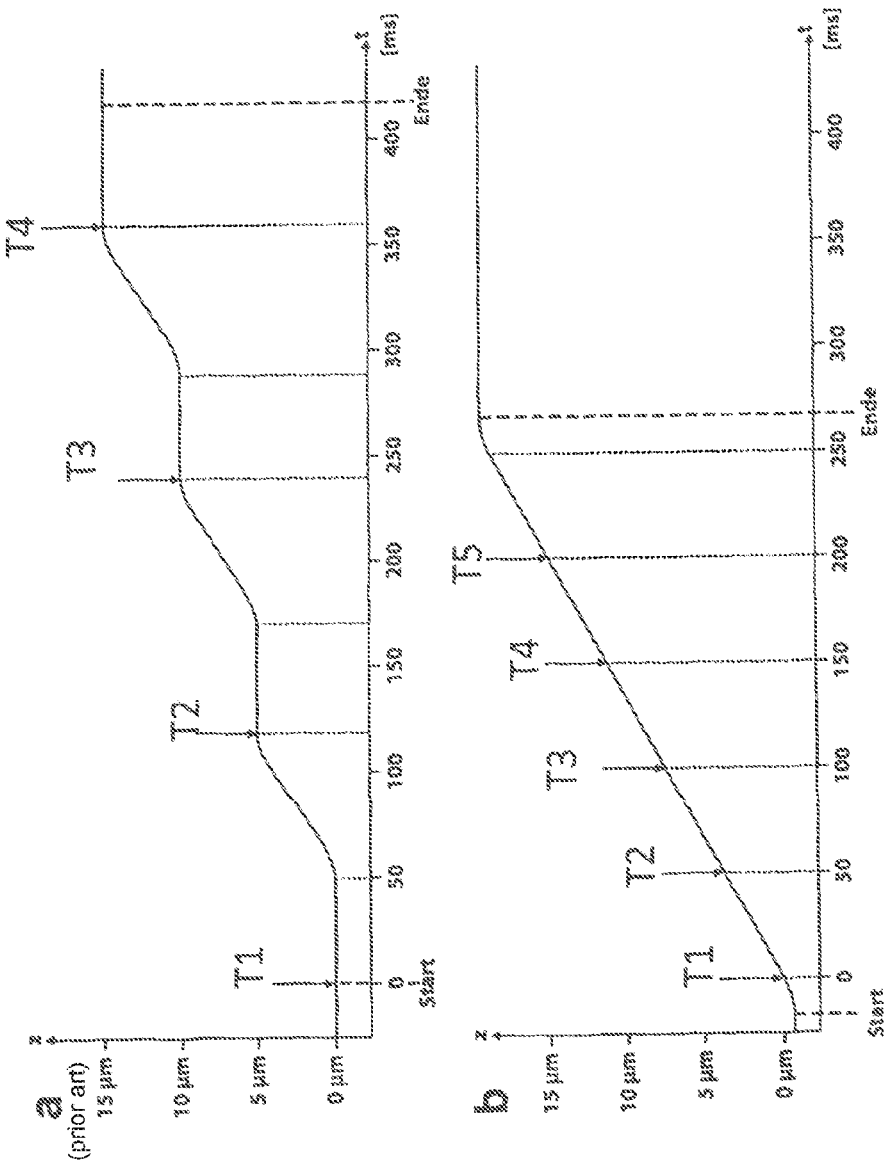

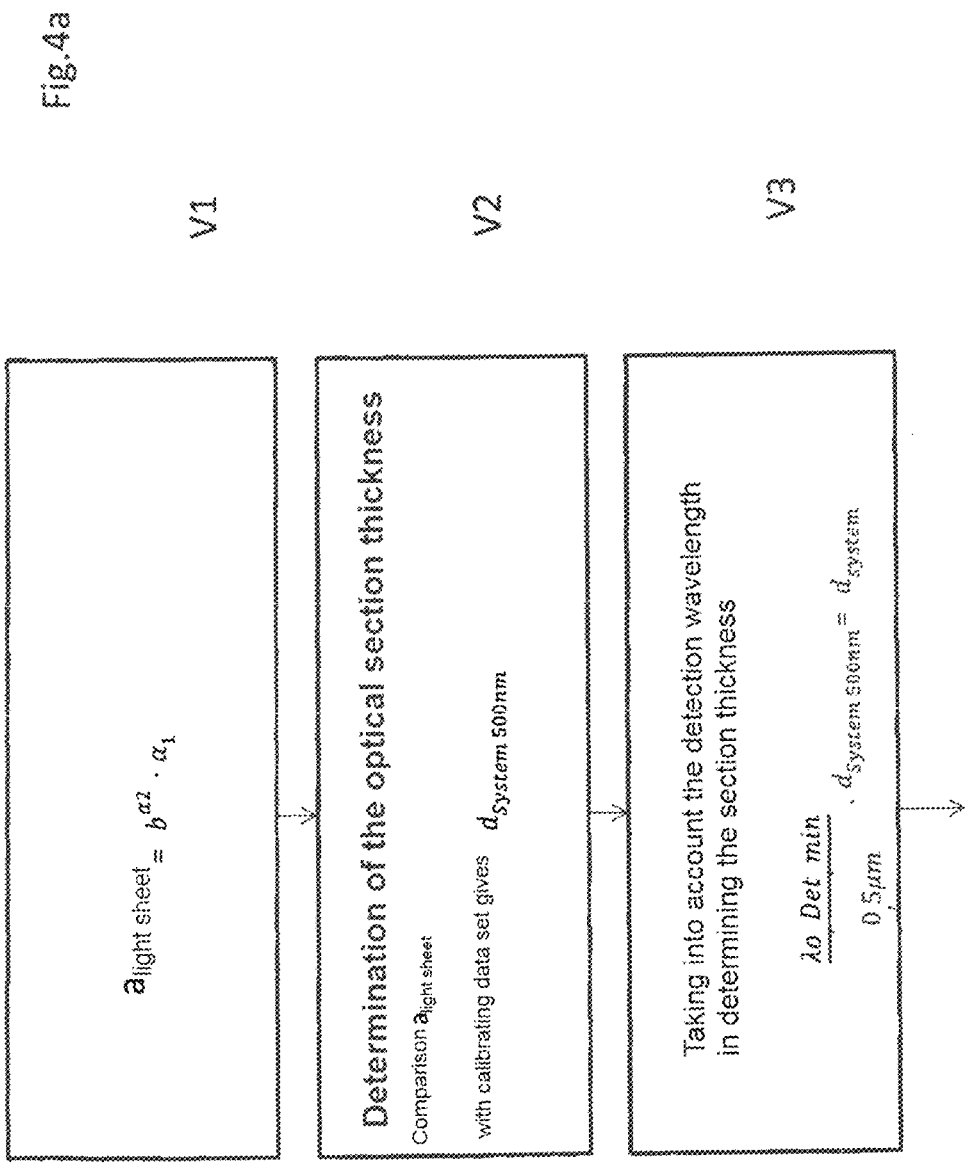

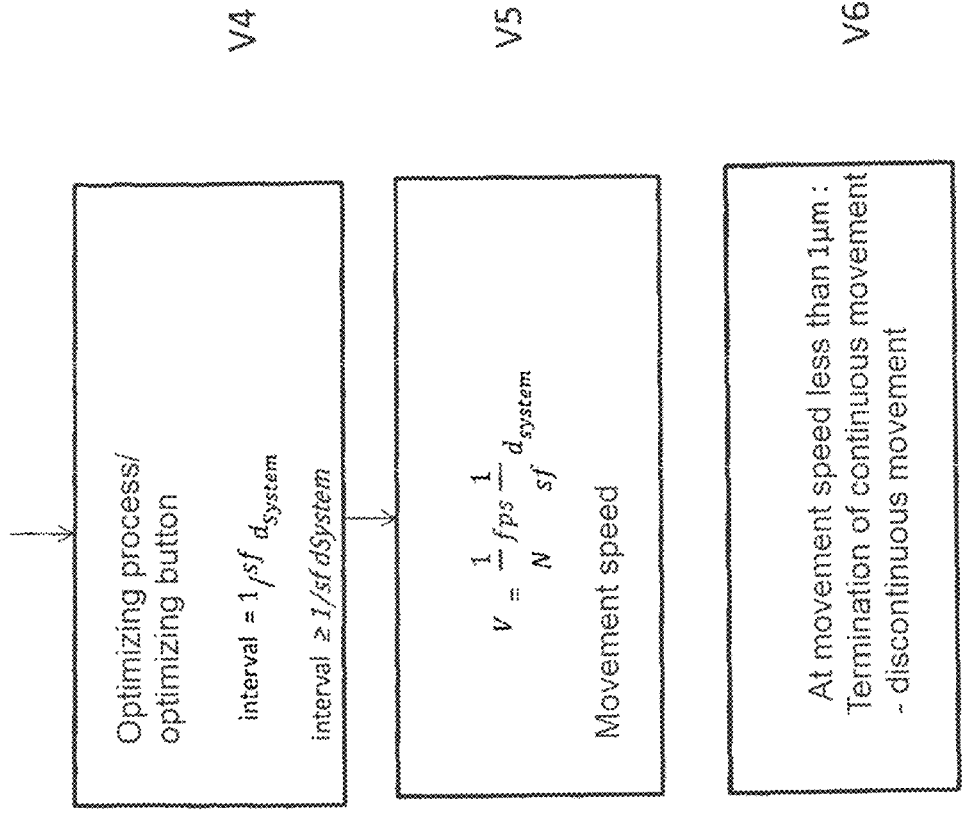

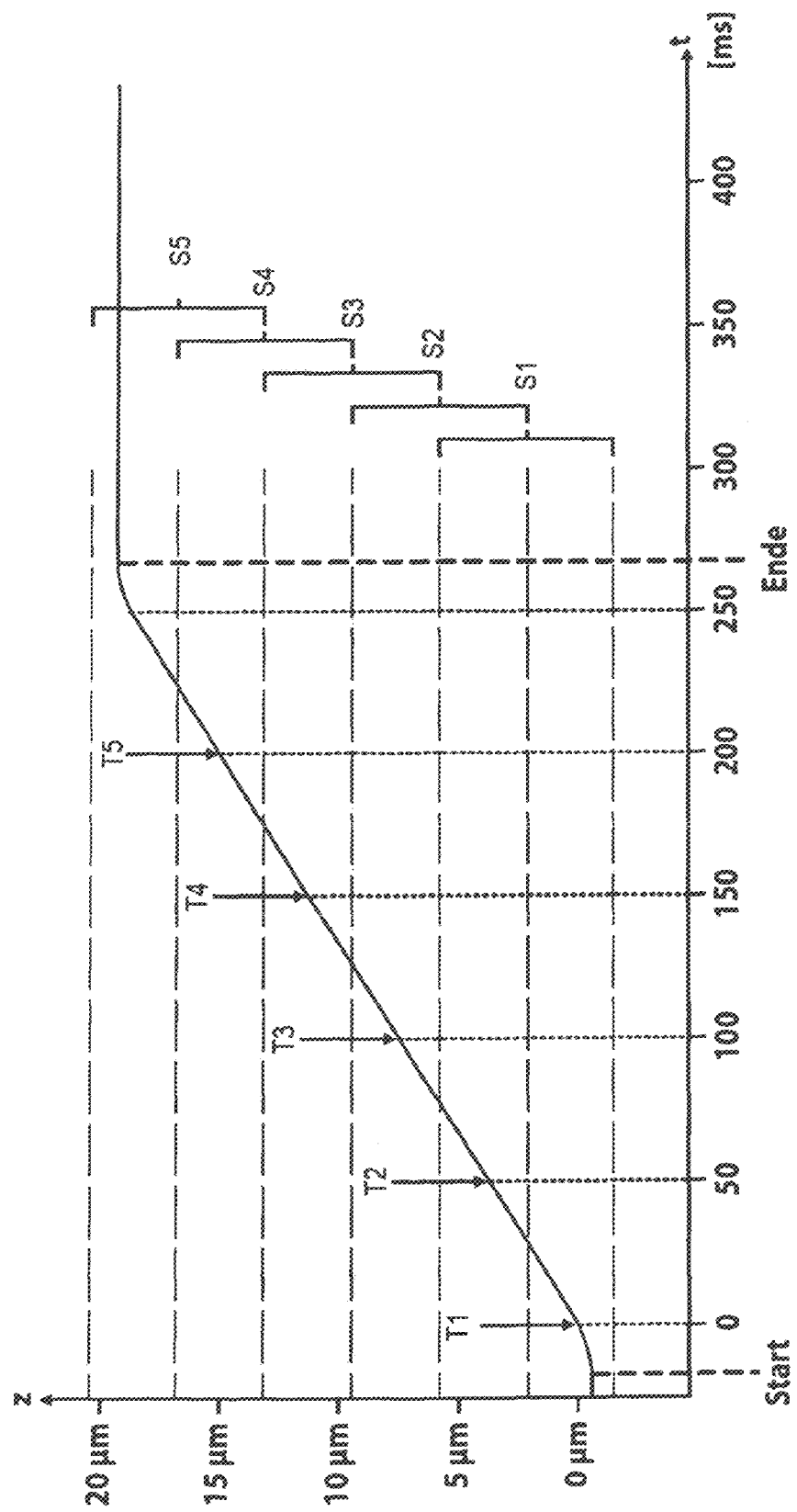

MICROSCOPE AND METHOD FOR SPIM MICROSCOPY

The present application claims priority from PCT Patent Application No. PCT/EP2012/004194 filed on Oct. 6, 2012, which claims priority from German Parent Application Nos. DE 10 2011 115 946.4 filed on Oct. 11, 2011, DE 10 2012 015 861.0 filed on Aug. 7, 2012, and DE 10 2012 019 466.8 filed on Sep. 28, 2012, the disclosures of which are incorporated herein by reference in their entirety.

FIELD OF THE INVENTION

The invention is directed to a microscope which comprises an imaging objective for imaging a sample on a detector and means for illuminating the sample with a light sheet in the focal plane of the imaging objective or in a defined plane in the vicinity of this focal plane. The means for illumination comprise an illumination source radiating preferably coherent light.

It is noted that citation or identification of any document in this application is not an admission that such document is available as prior art to the present invention.

A microscope in which illumination beam path and detection beam path are arranged substantially perpendicular to one another and in which the sample is illuminated by a light sheet in the focal plane of the imaging objective, i.e., perpendicular to the optical axis thereof, is designed for examining samples by the method of selective plane illumination microscopy (SPIM). In contrast to confocal laser scanning microscopy (LSM) in which a three-dimensional sample is scanned point by point in individual planes at different depths and the image information obtained in this way is subsequently compiled to form a three-dimensional image of the sample, SPIM technology is based on widefield microscopy and makes it possible to graphically display the sample on the basis of optical sections through individual planes of the sample.

The advantages of SPIM technology reside, inter alia, in the greater speed at which the acquisition of image data takes place, the reduced risk of bleaching of biological samples and an expanded penetration depth of focus in the sample.

Basically, in SPIM technology fluorophores which are contained in the sample or have been introduced into the sample are excited by laser light which is shaped to form a light sheet, as it is called. A selected plane in the depth of the sample is illuminated by the light sheet, and an image of this sample plane is acquired in the form of an optical section by imaging optics. The rapid back-and-forth movement of a thin rotationally symmetric laser beam in the focal plane of the imaging objective is essentially equivalent to this kind of excitation with a static light sheet. Dynamically, i.e., averaged over time over the time period of observation, this also results in the shape of a SPIM light sheet.

SPIM technology is described, for example, in Stelzer et al., *Optics Letters* 31, 1477 (2006), Stelzer et al., *Science* 305, 1007 (2004), DE 102 57 423 A1, and WO2004/0530558 A1.

FIG. 1 shows the basic construction of a SPIM microscope. The light from an illumination source 1 is shaped by illumination optics 2 to form a light sheet and is guided to a sample 3. The sample and the light sheet are located in the focal plane of an imaging objective 4. The optical axis of the imaging objective 4 extends perpendicular to the direction from which the sample 3 is illuminated. The illumination optics 2 generally comprise a plurality of optical elements which collimate the coherent light of the illumination source 1 and shape a light sheet therefrom. In the prior art, the illumination optics 2 generally also have a cylindrical lens having a flat side facing the sample and a curved side facing in direction of the illumination source.

By means of a sample holder PH, shown schematically, the sample is moved in direction of the optical axis of the objective 4 by motor under control of a control unit A, for example.

The described light sheet microscopy combines optical sections with widefield detection by a spatially resolving camera (CCD camera) in that the entire lateral focal plane (XY plane) of the detection objective is illuminated by a thin light sheet (FIG. 1). The light sheet illumination is effected at a right angle to the detection axis (Z axis).

The sample is positioned in the overlapping area of illumination and detection. Fluorescence signals which are excited by the illumination light sheet are imaged on the camera over the entire field of view of the detection objective. Only a small portion of the axial extension of the detection optics is illuminated by the right-angle illumination with a thin light sheet and an optical section is accordingly generated. To observe a different area in the sample, the sample is moved through the light sheet independently of the optics by a sample positioning unit. The capture of optical sections at various positions of the sample along the detection axis makes it possible to capture three-dimensional image stacks. These image stacks can be reconstructed subsequently to form a 3D image.

For this purpose, it is necessary to capture a plurality of three-dimensional image stacks from different angles. An image stack comprises, for example, 200 images. At least four different irradiation angles are needed for a three-dimensional image.

A typical experiment in light sheet microscopy is the tracking of the development of a biological organism over the course of 1 to 3 days, during which a 3D image is recorded about every five minutes. Thus approximately 1000 to 3000 image stacks are recorded during an experiment.

Supplementing FIG. 1 and based upon a disclosure in Huisken/Steinier (Development 136, 1963-1975 (2009) "Selective plane illumination microscopy techniques in developmental biology"), FIG. 2 shows a sample chamber PK which is filled with a liquid medium and which has windows F through which pass light of the sample illumination 1 with the light sheet LB and the detection light in direction of the detection objective 4 and a camera, not shown. The sample is displaced in detection direction along the optical axis OA of the detection direction as is indicated by the arrows.

According to the Huisken/Steinier disclosure, the sample is moved stepwise through the light sheet.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

BRIEF DESCRIPTION OF THE DRAWINGS

FIG. 1 shows the basic construction of a SPIM microscope.

FIG. 2 shows a sample chamber PK which is filled with a liquid medium and which has windows F through which pass light of the sample illumination 1 with the light sheet LB and the detection light in direction of the detection objective 4 and a camera, not shown.

FIG. 3 shows a comparison of the stepwise operation according to the prior art (3a) and the method according to an embodiment of the invention (3b).

FIGS. 4a and 4b show a method according to an embodiment of the invention.

FIG. 5 shows an overlap area of 50% with S1-S5 for the individual recording points T1-T5 with which the N individual recordings take place.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIG. 3 shows a comparison of the stepwise operation according to the prior art (3a) and the method according to en embodiment of the invention (3b).

The illustration shows the path Z traveled by the sample after the start of the measurement (start) in micrometers in direction of the optical axis of the objective 4 (vertical axis) as a function of time t in ms until the end of the measurement.

Points T1-4 show, respectively, a recording time of the detection arrangement, preferably a camera.

Specifically, for every step this means that
(FIG. 3a):
the sample is accelerated (approximately 10 ms)
a fixed distance is traversed
the sample must be braked again (approximately 10 ms)
there is a waiting period until the sample is again at rest (vibrations excited by the braking acceleration) (approximately 50 ms)
the image capture (T1-T4) is started in each instance (duration approximately 50 ms)
the sample is accelerated again after the image capture, and so on.

This stepwise procedure is very cumbersome because the sample must be accelerated and braked again and again. With 1000 image stacks at 200 images per stack during an experiment, the sample is moved stepwise approximately 200,000 times.

It is more efficient and faster to move the sample continuously at constant speed through the light sheet and to capture the images at periodic time intervals (FIG. 3b).

In this continuous movement, the acceleration times, movement times and rest periods (approximately 70 ms) are dispensed with. Arrows T1-T5 show the start of a new image capture; the gray areas represent the exposure time.

At typical exposure times of 50 ms, the image capture in continuous movement reduces the time for capturing an image stack by approximately 40%. At the same time, the time resolution is increased because it is possible to capture images consecutively faster.

The waiting period until the sample is at rest is done away with, and the acceleration of the sample need only be carried out once at the start. Accordingly, considering the typical values for the stepwise method, approximately 70 ms can be saved for each step. By comparison, the typical time for image capture is 50 ms! Consequently, entire image stacks can be captured much faster. At the same time, more image stacks can be recorded in the same time by means of this method and a higher time resolution is accordingly achieved in experiments.

Successful application of the method is based on a sample positioning unit which allows a continuous movement at extremely constant speed. Without this, a subsequent spatial allocation of the images is not longer possible.

The sample is also moved during the exposure time of the camera, i.e., the sample may not leave the axial resolution (approximately 1 μm) of the detection objective during this time period; otherwise a motion blur is visible on the camera. In order to compile a 3D image from the image stacks, a sufficiently large image overlap between two adjacent images must be ensured in addition; otherwise, failure will result. For these reasons, the sample must be moved very slowly. Typical movement speeds are 1 to 500 μm/s depending on the axial resolution and the exposure time of the camera.

At these movement speeds, the sample may not be farther than 2 μm from its reference position during its continuous movement. This parameter is referred to as dynamic contour error. The slower the movement speed, the more difficult it is to comply with the dynamic contour error because friction forces have a greater influence. Therefore, an optical or electronic path measurement is required during the constant movement.

In addition to the movement at constant speed, the position can also be measured very precisely (measurement accuracy <5 nm) at periodic intervals during the continuous movement. Accordingly, even very minute scaling errors in axial direction can be corrected by subsequent software correction of the individual images. To apply deconvolution algorithms for computational compilation of image stacks, there must still be an image overlap of about 50% between two axially adjacent images. If computational compiling of the image stacks is not needed and only a correct scaling is important, it is sufficient to measure the position during the movement and an extremely constant movement speed is no longer necessary.

Highly precise positioning of the sample is advantageous for a successful application of the method according to the invention. Typically, a positioning accuracy of <1 μm with a reproducibility of <200 nm is needed.

This ensures that the constant speed is reached after a fixed movement distance and movement time. Accordingly, the image stack starts at the desired location and there is no displacement of the image stack. Further, this also ensures that the same starting position is always used in case of repetitive capture of the same image stack.

Triggered starting and stopping of the movement is also advantageous in order to spare further communication time between electronics and PC (about 100 ms per command). Without triggered movement, the capture time with stepwise movement is protracted additionally by the communication time for each step.

Motion blur can come about as a result of image capture with continuous movement of the sample. This blur depends on the exposure time and movement speed. This effect can be minimized by an additional computing step after capture. The point spread function (PSF) is predictably distorted by the movement of the sample. If the exposure time and movement speed are known, the real PSF can be calculated and the images with calculated PSF can be deconvoluted. This "movement deconvolution" corresponds to a (mathematical) sharpening filter for this application.

FIGS. 4a/b describe a method with method steps V1-V6 for taking into account the actual and then the effective, i.e., practical, light sheet thickness in the above-described continuous drive according to the invention and a termination criterion leading to the transition to a discrete recording movement.

Key to Abbreviations $a_{light\ sheet}$ is the light sheet thickness in μm. The minimum light sheet thickness is currently about 1 to 2 micrometers $a_1$, $a_2$ are calibrating parameters of the illumination objective. There is a specific parameter set for each objective; $a_1$ is given in μm, $a_2$ is dimensionless b represents the setting of the illumination zoom $\lambda 0$, Det,min is the wavelength of the detection in μm. For example, it is the wavelength of the illumination $\lambda_{0,il}$ +0.01 μm. This would be a typical Stokes shift (red shift between excitation and detection) of a fluorescent dye. In practice, the fluorescent dye that is used is known and the correct Stokes shift for this dye is used (e.g., from a database). When illuminating with a plurality of wavelengths, the smallest is generally used.

0.5 μm The 0.5 micrometers correspond to an exemplary detection wavelength which lies approximately in the center of the detection spectrum for which a theoretical optical section thickness was calculated.

Interval The interval may never be less than that calculated in the optimization sf is the sampling factor $d_{System}$ is the optical section thickness of the system $V_{cont.drive}$ is the movement speed in continuous drive N is the quantity of images which are to be captured from a Z position, for example, 1, 2 or 4.

fps refers to effective frames per second and designates the images captured per second.

The following method steps V1-V6 are shown in the flow diagram of FIGS. 4a/b:

Method Step V1:
Calculation of the light sheet thickness $$a_{light\ sheet} = b^{\alpha 2} \cdot \alpha_1$$

Method Step V2:
Determination of the optical section thickness $d_{system,500\ nm}$ is determined from $a_{light\ sheet}$ by means of a calibration table.

Methods Step V3:
The detection wavelength is taken into account $$\frac{\lambda_{0,Det,min}}{0.5\ \mu m} \cdot d_{System,500\ nm} = d_{system}$$

Method Step V4:
Optimization process $$interval \geq 1/sf d_{System}$$

is the condition (see below), it is generally determined that:

$$interval = 1/sf d_{System}$$

Method Step V5:
Movement speed:

$$v = \frac{1}{N} fps \frac{1}{sf} d_{system}$$

Method Step V6:
Termination of continuous drive

At a movement speed of less than a limit value, e.g., 1 μm, there is a termination of the continuous movement and a transition to a discontinuous movement for image capture.

The field of view of the microscope is adjusted by zoom optics which are generally used, the zoom value is b in the first step V1.

$a_{light\ sheet}$ is the light sheet thickness taking into account zoom value b.

The actual optical section thickness d is given (second step V2) as a function of the PSF, the objective that is used, the liquid medium that is used in the sample chamber, and other influences.

Due to the multitude of influences on the actual optical section thickness, this optical section thickness is acquired beforehand based on a calibrating data set for various objectives, liquids and other variable quantities and is then read off/entered.

Further, the detection wavelength XXX that is used is also taken into account (third step V3) in determining the section thickness.

The effective optical section thickness is generally less than/equal to the light sheet thickness. The possible optimal recording interval is determined (optimization step in V4) by means of an "optimal" setting by the user (optimal button).

Interval≥1/sf dSystem in this case is a condition for the software. The user has the option of adjusting any interval, but never less than 1/sf dSystem. This limit is predetermined by the cameras and exposure times which are used. In addition, the assignment of the Z coordinates to the corresponding camera image are no longer applicable if the intervals are too small.

In this case, an overlap (e.g., 50%) is adjusted by the user with sf generally between two completed recordings in order to produce a complete coverage based on the object structure when preparing a complete Z stack from the individual recordings.

FIG. 5 shows an overlap area of 50% with S1-S5 for the individual recording points T1-T5 with which the N individual recordings take place. The overlap area of an individual recording at the precise time T1-T5 is shown in each instance; the overlap areas of the N individual recordings within the depth of focus appear in a corresponding manner.

N is the number of images which are recorded at a depth of focus of the objective. With respect to the diagram, this means that N images are to be taken per T1, T2.

Sf is the sampling factor (the overlap area), i.e., at 50%=2

It is determined in V5 where the required movement speed v is determined from the settings and determined values.

During continuous movement below 1 micrometer, it is no longer possible to implement a reproducible drive (because of friction losses and other losses inter alia).

With other technologies (e.g., piezo-motors), slower movement speeds could be realized, but there is always a lower limit. Thus the resulting movement speed should be above 1 micrometer, for example (see above) in order to enable a continuous drive. Otherwise, a discrete image capture is selected and adjusted. (Step V6)

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method for SPIM microscopy comprising:
providing a microscope comprising:
an illumination device comprising an illumination light source and an illumination beam path configured to illuminate a sample with a light sheet; and
a detection arrangement configured to detect light which is radiated from the sample with an objective;
wherein the light sheet, in the focus of the objective or of a defined plane in the vicinity of the focus of the objective, is substantially planar; and
wherein the objective has an optical axis which intersects the plane of the light sheet at a non-zero angle; and
determining a movement speed of the sample through the light sheet;
moving the sample through the light sheet in direction of the optical axis of the objective to acquire different sample planes;
wherein the sample is moved continuously through the light sheet when the movement speed is greater than a predetermined termination-criterion value;
wherein the sample is moved discontinuously through the light sheet when the movement speed is less than the predetermined termination-criterion value; and
wherein a plurality of images are taken at time intervals by means of the detection arrangement during the movement of the sample.

2. The method according to claim 1;
wherein the microscope is further provided with a sample chamber that has at least one light-transparent window in illumination direction and in detection direction.

3. The method according to claim 1;
wherein an image capture duration or an exposure time is determined such that the movement path of the sample lies within a predetermined resolution range of the objective.

4. The method according to claim 3;
wherein the movement speed of the sample through the light sheet is determined and adjusted based on the image capture duration or the exposure time that is used.

5. The method according to claim 4;
wherein a distortion of a point spread function generated by the movement of the sample is corrected computationally based on the determined image capture duration and the movement speed.

6. The method according to claim 1;
wherein the sample is moved continuously at a constant speed through the light sheet.

7. The method according to claim 1, further comprising:
determining an actual optical section thickness of the light sheet; and
taking into account optical characteristics of the objective that is used when determining the actual optical section thickness of the light sheet.

8. The method according to claim 1, further comprising:
determining an actual optical section thickness of the light sheet; and
taking into account an illumination wavelength of the light sheet which is used when determining the actual optical section thickness of the light sheet.

9. The method according to claim 1;
wherein at least one user setting is utilized when determining the movement speed of the sample through the light sheet, the at least one user setting being selected from the group consisting of a frequency of image capture, and a degree of overlap of image captures in direction of a detection axis.

10. A SPIM microscope comprising:
an illumination device comprising an illumination light source and an illumination beam path configured to illuminate a sample with a light sheet; and
a detection arrangement configured to detect light which is radiated from the sample with an objective;
wherein the light sheet in the focus of the objective or of a defined plane in the vicinity of the focus of the imaging objective is substantially planar and the objective has an optical axis which intersects the plane of the light sheet at a non-zero angle; and
wherein the microscope is configured to move the sample through the light sheet in direction of the optical axis of the objective to acquire different sample planes;
wherein the microscope is configured to determine a movement speed of the sample through the light sheet;
wherein the microscope is configured to move the sample continuously through the light sheet when the movement speed is more than a predetermined termination-criterion value;
wherein the sample is moved discontinuously through the light sheet when the movement speed is less than the predetermined termination-criterion value; and
wherein the microscope is configured to take a plurality of images at time intervals by means of the detection arrangement during the movement of the sample.

11. A computer system controlling a microscope for SPIM microscopy:
wherein the microscope comprises:
an illumination device comprising an illumination light source and an illumination beam path configured to illuminate a sample with a light sheet; and
a detection arrangement configured to detect light which is radiated from the sample with an objective;
wherein the light sheet in the focus of the objective or of a defined plane in the vicinity of the focus of the imaging objective is substantially planar and the objective has an optical axis which intersects the plane of the light sheet at a non-zero angle; and wherein the computer system comprises:
  at least one processor;
  at least one interface operatively coupled to the at least one of the processor; and
  a computer-readable storage medium operatively coupled to the at least one processor, and encoded with instructions that, when executed by the at least one processor, cause the computer system to interact with a microscope to cause actions comprising:
    moving the sample through the light sheet in direction of the optical axis of the objective to acquire different sample planes;
    determining a movement speed of the sample through the light sheet;
    wherein the sample is moved continuously through the light sheet when the movement speed is more than a predetermined termination-criterion value;
    wherein the sample is moved discontinuously through the light sheet when the movement speed is less than the predetermined termination-criterion value; and
    wherein a plurality of images are taken at time intervals by means of the detection arrangement during the movement of the sample.

12. A computer-readable storage medium encoded with instructions that when executed by at least one processor within a computer system, that comprises at least one interface operatively coupled to the at least one processor, cause the computer system to interact with a microscope; wherein the microscope comprises:
  an illumination device comprising an illumination light source and an illumination beam path configured to illuminate a sample with a light sheet; and
  a detection arrangement configured to detect light which is radiated from the sample with an objective;
  wherein the light sheet in the focus of the objective or of a defined plane in the vicinity of the focus of the imaging objective is substantially planar and the objective has an optical axis which intersects the plane of the light sheet at a non-zero angle; and
wherein the instructions, when executed by the at least one processor, cause the computer system to interact with a microscope to cause actions comprising:
  moving the sample through the light sheet in direction of the optical axis of the objective to acquire different sample planes;
  determining a movement speed of the sample through the light sheet;
  wherein the sample is moved continuously through the light sheet when the movement speed is more than a predetermined termination-criterion value;
  wherein the sample is moved discontinuously through the light sheet when the movement speed is less than the predetermined termination-criterion value; and
  wherein a plurality of images are taken at time intervals by means of the detection arrangement during the movement of the sample.

\* \* \* \* \*